(12) United States Patent
Benevides Guerrero et al.

(10) Patent No.: US 12,534,382 B2
(45) Date of Patent: Jan. 27, 2026

(54) AMORPHOUS TITANIUM DIOXIDE PRECURSOR MATERIAL, METHOD OF PRODUCING THEREOF AND METHOD OF CONTROLLING CRYSTALLINE PHASES THEREOF

(71) Applicant: ÉCOLE DE TECHNOLOGIE SUPÉRIEURE, Montreal (CA)

(72) Inventors: Jaime Alberto Benevides Guerrero, Montreal (CA); Charles Philippe Trudeau, Montreal (CA); Luis Felipe Gerlein Reyes, Montreal (CA); Sylvain Cloutier, Montreal (CA)

(73) Assignee: ÉCOLE DE TECHNOLOGIE SUPÉRIEURE, Montréal (CA)

( * ) Notice: Subject to any disclaimer, the term of this patent is extended or adjusted under 35 U.S.C. 154(b) by 548 days.

(21) Appl. No.: 17/048,858

(22) PCT Filed: Apr. 18, 2019

(86) PCT No.: PCT/CA2019/000049
§ 371 (c)(1),
(2) Date: Oct. 19, 2020

(87) PCT Pub. No.: WO2019/200453
PCT Pub. Date: Oct. 24, 2019

(65) Prior Publication Data
US 2022/0227638 A1    Jul. 21, 2022

Related U.S. Application Data

(60) Provisional application No. 62/660,534, filed on Apr. 20, 2018.

(51) Int. Cl.
*C01G 23/08*     (2006.01)
*B01J 13/00*     (2006.01)
(Continued)

(52) U.S. Cl.
CPC .......... *C01G 23/08* (2013.01); *B01J 13/0069* (2013.01); *B01J 19/127* (2013.01); *C01G 23/053* (2013.01);
(Continued)

(58) Field of Classification Search
CPC .... C01G 23/08; C01G 23/053; B01J 13/0069; B01J 19/127
See application file for complete search history.

(56) References Cited

U.S. PATENT DOCUMENTS

| 2004/0241976 A1 | 12/2004 | Fukuhisa et al. |
| 2012/0001172 A1* | 1/2012 | Shang .................. C01B 13/145 257/E29.094 |

(Continued)

FOREIGN PATENT DOCUMENTS

WO    2016046426 A1    3/2016

OTHER PUBLICATIONS

Adraider et al, Fabrication of titania coatings on stainless steel via laser-induced deposition of colloidal titanium oxide from sol-gel suspension, 2013, Materials Chemistry and Physics, 138, 245-252 (Year: 2013).*

(Continued)

*Primary Examiner* — James A Fiorito
(74) *Attorney, Agent, or Firm* — Lavery, de Billy, L.L.P.; Isabelle Pelletier (57) ABSTRACT

Titanium dioxide (TiO2) forms the basis of devices for applications including sensing devices, solar cells, photo-electrochromics, and photocatalysis. Such devices exploit different phases of TiO2 within such devices and accordingly it would be beneficial to have an amorphous TiO2 precursor which allows crystalline phase spatial patterning, for the crystallization of the amorphous TiO2 precursor to be triggered at low energies, and with the crystalline phase (Continued)

controllable at room-temperature without necessitating complex handling whilst providing TiO2 phases that are stable over a prolonged period of time. Accordingly, there are provided processes for providing a TiO2 precursor and controlling the conversion of the TiO2 precursor from amorphous-to-anatase, amorphous-to-rutile, amorphous-to-mixture of anatase/rutile or from amorphous-to-anatase-to-rutile in a simple and efficient manner.

11 Claims, 8 Drawing Sheets

(51) Int. Cl.
 B01J 19/12 (2006.01)
 C01G 23/053 (2006.01)
(52) U.S. Cl.
 CPC ...... C01P 2002/01 (2013.01); C01P 2002/82 (2013.01); C01P 2004/03 (2013.01); C01P 2004/04 (2013.01)

(56) References Cited

U.S. PATENT DOCUMENTS

2013/0012650 A1* 1/2013 Carzino .................. C08J 3/215
 977/773
2014/0242289 A1 8/2014 Morita et al.

OTHER PUBLICATIONS

Camacho-Lopez et al, Raman studies on laser induced crystallization of Co(II) doped titania; effect of the dopant concentration, 2002, Optical Materials, 20, 43-50 (Year: 2002).*
Adraider et al, Fabrication of titania coatings on stainless steel via laser-induced deposition of colloidal titanium oxide from sol-gel suspension, Materials Chemistry and Physics, 2013, 138, 245-252.
Boschloo, G., Lindstrom, H., Magnusson, E., Holmberg, A., & Hagfeldt, A., Optimization of dye-sensitized solar cells prepared by compression method, Journal of Photochemistry and Photobiology A: Chemistry, 2002, 148(1), 11-15.
Camacho-Lopez et al, Raman studies on laser induced crystallization of Co(II) doped titania; effect of the dopant concentration, Optical Materials, 2002, 20, 43-50.
Choudhury, B. and Choudhury, A., Oxygen Defect Dependent Variation of Band Gap, Urbach Energy and Luminescence Property of Anatase, Anatase-Rutile Mixed Phase and of Rutile Phases of $TiO_2$ Nanoparticles, Physica E: Low-dimensional Systems and Nanostructures, 2014, 56, 364-371.
DeSario, P. A., Chen, L., Graham, M. E., & Gray, K. A., Effect of oxygen deficiency on the photoresponse and reactivity of mixed phase titania thin films, Journal of Vacuum Science & Technology A: Vacuum, Surfaces, and Films, 2011, 29(3), 031508.
Di Paola, A., Bellardita, M., & Palmisano, L., Brookite, the least known $TiO_2$ photocatalyst. Catalysts, 2013, 3(1), 36-73.
Diebold, U., The surface science of titanium dioxide. Surface Science Reports, 2003 48(5-8), 53-229.
Dürr, M., Schmid, A., Obermaier, M., Rosselli, S., Yasuda, A., & Nelles, G., Low-temperature fabrication of dye- sensitized solar cells by transfer of composite porous layers, Nature Materials, 2005, 4(8), 607-611.
Emeline, A. V., et al., Visible-light-active titania photocatalysts: The case of N-doped $TiO_2$s-Properties and some fundamental issues, International Journal of Photoenergy, 2008, Article ID 258394, 1-19.
Farooq et al., Effects of 1064 nm Laser on the Structural and Optical Properties of Nanostructured TiO2 Thin Film, Optics and Spectroscopy, 2014, vol. 117 No. 3, 386-391.

Guo, L et al., $MoS_2$/$TiO_2$ heterostructures as nonmetal plasmonic photocatalysts for highly efficient hydrogen evolution, Energy & Environmental Science, 2018, 11, 106-114.
Gupta, S. M. and Tripathi, M., A review of $TiO_2$ nanoparticles, Chinese Science Bulletin, 2011, 56(16), 1639-1657.
Hanaor, D. A. H. and Sorrell, C. C., Review of the anatase to rutile phase transformation, Journal of Materials Science, 2011, 46(4), 855-874.
Haque, S. A. et al., Flexible dye sensitised nanocrystalline semiconductor solar cells, Chemical Communications, 2003, (23), 3008-3009.
Hsu et al., Raman study of structural transformations of titania coatings induced by laser annealing, Applied Physics Letters, 1984, vol. 45(10) 1065-1067.
Huang, A. P. et al., Microstructure and visible-photoluminescence of titanium dioxide thin films fabricated by dual cathodic arc and nitrogen plasma deposition, Surface and Coatings Technology, 2007, 201(16-17), 4897-4900.
Hwu, Y. et al., X-ray absorption of nanocrystal $TiO_2$. Nanostructured Materials, 1997, 9(1), 355-358.
Joo, J. et al., Large-scale synthesis of $TiO_2$ nanorods via nonhydrolytic sol-gel ester elimination reaction and their application to photocatalytic inactivation of E. coli, The Journal of Physical Chemistry B, 2005, 109(32), 15297-15302.
Kado, T et al., Low temperature preparation of nano-porous $TiO_2$ layers for plastic dye sensitized solar cells. Chemistry Letters, 2003, 32(11), 1056-1057.
Kafizas, A. et al., Does a photocatalytic synergy in an anatase-rutile $TiO_2$ composite thin-film exist? Chemistry—A European Journal, 2012, 18(41), 13048-13058.
Komaguchi, K. et al., Electron-transfer reaction of oxygen species on $TiO_2$ nanoparticles induced by sub-band-gap illumination, The Journal of Physical Chemistry C, 2010, 114(2), 1240-1245.
Komaguchi, K. et al., Photoinduced electron transfer from anatase to rutile in partially reduced $TiO_2$ (P-25) nanoparticles: An ESR study, Chemical Physics Letters, 2006, 428(4-6), 338-342.
Koparde, V. N. and Cummings, P. T., Phase transformations during sintering of titania nanoparticles, ACS Nano, 2008, 2(8), 1620-1624.
Krylova, G., and Na, C., Photoinduced crystallization and activation of amorphous titanium dioxide, The Journal of Physical Chemistry C, 2015, vol. 119(22), 12400-12407.
Li, G. et al., Synergistic effect between anatase and rutile $TiO_2$ nanoparticles in dye-sensitized solar cells, Dalton Transactions, 2009, (45), 10078-10085.
Li, L. et al., Sub-10 nm rutile titanium dioxide nanoparticles for efficient visible-light-driven photocatalytic hydrogen production, Nature Communications, 2015, 6, 5881.
Lindström, H. et al., A new method for manufacturing nanostructured electrodes on glass substrates, Solar Energy Materials and Solar Cells, 2002, 73(1), 91-101.
Ma, H. L. et al., Raman study of phase transformation of $TiO_2$ rutile single crystal irradiated by infrared femtosecond laser, Applied Surface Science, 2007, 253(16), 7497-7500.
Madras, G. and McCoy, B. J., Kinetic model for transformation from nanosized amorphous $TiO_2$ to anatase. Crystal Growth & Design, 2007, 7(2), 250-253.
Marinescu, C. et al., DSC investigation of nanocrystalline $TiO_2$ powder, Journal of Thermal Analysis and Calorimetry, 2011, 103(1), 49-57.
McDonald, S. A. et al., Solution-processed PbS quantum dot infrared photodetectors and photovoltaics. Nature Materials, 2005, 4(2), 138-142.
Mo, S.-D. and Ching, W. Y., Electronic and optical properties of three phases of titanium dioxide: Rutile, anatase, and brookite, Physical Review B, 1995, 51(19), 13023-13032.
Moritz et al., TF-XRD examination of surface-reactive $TiO_2$ coatings produced by heat treatment and $CO_2$ laser treatment, Biomaterials, 2005, vol. 26, 4460-4467.
Mueses, M. A. et al., Effective quantum yield and reaction rate model for evaluation of photocatalytic degradation of water contaminants in heterogeneous pilot-scale solar photoreactors, Chemical Engineering Journal, 2013, vol. 215-216, 937-947.

(56) References Cited

OTHER PUBLICATIONS

Nakaoka, Y. and Nosaka, Y., ESR investigation into the effects of heat treatment and crystal structure on radicals produced over irradiated $TiO_2$ powder, Journal of Photochemistry and Photobiology A: Chemistry, 1997, 110(3), 299-305.

Ohno, T. et al., Synergism between rutile and anatase $TiO_2$ particles in photocatalytic oxidation of naphthalene, Applied Catalysis A: General, 2003, 244(2), 383-391.

Reyes-Coronado, D. et al., Phase-pure $TiO_2$ nanoparticles: anatase, brookite and rutile, Nanotechnology, 2008, 19(14), 145605.

Ricci, P. C. et al., Anatase-to-rutile phase transition in $TiO_2$ nanoparticles irradiated by visible light, The Journal of Physical Chemistry C, 2013, 117(15), 7850-7857.

Ricci, P. C. et al., Optically controlled phase variation of $TiO_2$ nanoparticles, The Journal of Physical Chemistry C, 2010, 114(34), 14441-14445.

Satoh, N. et al., Metastability of anatase: Size dependent and irreversible anatase-rutile phase transition in atomic-level precise titania, Scientific Reports, 2013, 3, 1959.

Simic, M. et al., $TiO_2$-based thick film pH sensor, IEEE Sensors Journal, 2017, 17(2), 248-255.

Stagi, L. et al., Light induced $TiO_2$ phase transformation: Correlation with luminescent surface defects, Physica Status Solidi B, 2015, 252(1), 124-129.

Styskalik et al., The Power of Non-Hydrolytic Sol-Gel Chemistry: A Review, Catalysts, 2017, vol. 7, Issue 6, No. 168, 1-42.

Sun, Y. et al., High anatase-rutile transformation temperature of anatase titania nanoparticles prepared by metalorganic chemical vapor deposition, Japanese Journal of Applied Physics, 2002, 41(8B), L945-L948.

Vásquez, G. C., et al., Laser-induced anatase-to-rutile transition in $TiO_2$ nanoparticles: Promotion and inhibition effects by Fe and Al doping and achievement of micropatterning, The Journal of Physical Chemistry C, 2015, 119(21), 11965-11974.

Wei, N. et al., $Bi_2O_3$ nanoparticles incorporated porous $TiO_2$ films as an effective p-n junction with enhanced photocatalytic activity, Journal of the American Ceramic Society, 2017, 100(4), 1339-1349.

Zeng, G. et al., Micro-Raman mapping on an anatase $TiO_2$ single crystal with a large percentage of reactive (001) facets, Vibrational Spectroscopy, 2013, 68, 279-284.

Zhang, H. and Banfield, J. F., Kinetics of crystallization and crystal growth of nanocrystalline anatase in nanometer-sized amorphous titania, Chemistry of Materials, 2002, 14(10), 4145-4154.

* cited by examiner

AMORPHOUS TITANIUM DIOXIDE PRECURSOR MATERIAL, METHOD OF PRODUCING THEREOF AND METHOD OF CONTROLLING CRYSTALLINE PHASES THEREOF

CROSS-REFERENCE TO RELATED APPLICATIONS

This application claims the benefit of priority as a 371 national phase entry application of PCT/CA2019/000,049 filed 18 Apr. 2019 entitled "An Amorphous Titanium Dioxide Precursor Material, Method of Producing Thereof and Method of Controlling Crystalline Phases Thereof", which itself claims the benefit of priority from U.S. Provisional Patent Application 62/660,534 filed 20 Apr. 2018 entitled "An Amorphous Titanium Dioxide Precursor Material, Method of Producing Thereof and Method of Controlling Crystalline Phases Thereof."

FIELD OF THE INVENTION

The present application relates to an amorphous titanium dioxide precursor material and more particularly to a chemically stable amorphous titanium dioxide precursor material that can be controlled to form various crystallization phases, methods of producing different phases of crystalline titanium dioxide from the precursor, and films and products formed using the precursor with single or multiple phases of crystalline titanium dioxide, where different crystalline phases can be formed next to one another within a single manufacturing step.

BACKGROUND OF THE INVENTION

Titanium dioxide is widely used for its non-toxicity, chemical and biological stability, strong oxidizing power, high photochemical corrosive resistance and low cost. Within the last ten years this material has formed the basis for devices in a wide variety of applications including sensing devices, organic dye- and quantum dot-sensitized solar cells, photo-electrochromics, water-splitting and photocatalysis for extensive environmental applications, among others. All of these applications of titanium dioxide, $TiO_2$ ($TiO2$) stem from its unique optoelectronic properties, which strongly depend on the crystalline structure. Moreover, it has been established that synergistic effects from combining multiple crystalline structures of titanium dioxide in the same device can have positive consequences on these properties. However, the problem that processing engineers are facing is how to spatially engineer the mixing of these crystalline phases to effectively control the synergism between different crystalline phases, in a manner that is compatible with their formation and spatial patterning that is usually implemented within a semiconductor processing line. All this, in order to leverage the benefits of direct electronic integration, monolithic integration, large automated substrate handling, high volumes and low potential costs.

Thermal annealing between 450° C. and 1100° C. is generally required to transition the titanium dioxide to the desired crystalline structure starting from amorphous TiO2. The anatase structure of TiO2 generally appears at around 450° C., while conversion to rutile appears between 800° C. to 1100° C.

Anatase TiO2 has a tetragonal structure with six atoms in each primitive cell and corresponds to a metastable phase. With its relatively wide electronic bandgap of 3.2 eV anatase TiO2 makes a superb blocking layer for optoelectronic or photovoltaic devices. In contrast, rutile TiO2 is also tetragonal, but with twelve atoms in its primitive cell, making it a more stable phase. However, rutile TiO2 has a lower electronic bandgap of 3.0 eV and is accordingly better suited for photoelectrochemical applications. The brookite phase of TiO2 which exists in addition to the amorphous, anatase, and rutile forms is the least studied phase as it is difficult to synthesize pure. Although rutile is acknowledged as the most stable phase for bulk TiO2, anatase is more stable for TiO2 nanoparticles that are smaller than 50 nm.

High-temperature treatment is also generally used to sinter nanocrystalline TiO2 particles and form interconnected nanoparticle networks. This sintering process is generally performed around at 500° C. Given the wide range of possibilities that TiO2 has to offer for the development of new flexible, lightweight and wearable technologies, its integration with either low temperature substrates or later in semiconductor processing lines such as atop CMOS for example, is limited due to the high temperature processing required. Indeed, substrate selections have been limited to those supporting high temperature processing and the process sequence is generally defined to crystallize or sinter the TiO2 before its integration in the devices and execution of the later lower temperature semiconductor processing steps. Therefore, it would be beneficial to avoid these high temperatures used to reach the anatase and rutile crystalline phases.

Different approaches have been explored to produce TiO2-based devices at low temperatures. For example, pre-sintered TiO2 porous layers can be used, but the relatively complex transfer process requires a thin adhesion layer between the pre-sintered TiO2 film and the substrate, followed by an application of high pressures and moderate temperatures. Alternative approaches towards low-temperature device assembly have included compression methods and the use of conductive inks or electrolytes between the TiO2 particles. While these approaches partially succeeded in avoiding high-temperature sintering, they suffer the disadvantages that the degree of crystallinity and the optoelectronic properties of the resulting TiO2 films are far from ideal.

Reyes-Coronado in "Phase Pure TiO2 Nanoparticles: Anatase, Brookite and Rutile" (Nanotechnology, Vol. 19, 145605, 2008) reports that Amorphous TiO2 nanoparticles achieve conversion to anatase, rutile and brookite via hydrothermal treatments at temperatures of 200° C. with the appropriate reactant for each conversion process. The nanoparticle diameters for each phase are different and are shown to increase by increasing the hydrothermal processing time. However, processing to deposit different phase nanoparticles in different adjacent regions would present significant challenges and mixed-phase compositions could not be formed by the process reported by Reyes-Coronado.

International Patent Application No. PCT/ES2015/000129 to Vasquez Villanueva et al. discloses the Pecchini method to synthetize a powder of ceramic doped-TiO2. The method allows nanosized control but requires adding a dopant to the TiO2 particles. Doping of the TiO2 facilitates the conversion process but affects the properties of the final product and limits the possible applications and integration with other manufacturing techniques. For instance, high purity material is preferable for integrating with silicon in semi conductive technologies. Moreover, the method requires the TiO2 precursor to be heated at 350° C. for 30 hours and to be additionally heated at 450° C. for 15 hours when doping with Iron (Fe) or at 550° C. for 15 hours when doping with Aluminum (Al). Notice that in both cases the method yields an anatase doped TiO2 powder as the base to trigger the phase transition to rutile using laser treatment. The phase transition from anatase to rutile takes place using a compressed tablet of the TiO2-doped powder. The laser is irradiated on top and a thin layer of the tablet is converted into rutile. The high temperature and high-pressure process makes it difficult to include in the production of optoelectronic devices or integration with optoelectronic devices based on vertically aligned nanostructures. Moreover, the pressing step is not compatible with the production of some devices such as large devices, especially in the presence of highly crystalline components. The use of compressed powders, specifically in nanofabrication and optoelectronic devices are rather limited. The method is not capable of producing a TiO2 precursor that is pure, amorphous and that can be easily converted at room temperature to either an anatase phase, a rutile phase or a mixture of anatase and rutile phases.

Moreover, the method disclosed in the Vasquez Villanueva et al. reference produces rutile areas that are not fully converted due to the presence of dopants and the optoelectronic performance of the rutile TiO2 will not be the same as with a monocrystalline phase. This can be seen in the Raman signals presented in The Journal of Physical Chemistry C 2015 119 (21), 11965-11974 to Vasquez Villanueva et al. that corresponds to International Patent Application No. PCT/ES2015/000129 (DOI: 10.1021/acs.jpcc.5b01736).

In the Journal of Physical Chemistry C 2013 117 (15), 7850-7857 (DOI: 10.1021/jp312325h) to Ricci, P. C., et al., there is disclosed that the irradiation of nanometer-sized anatase particles with visible light induces the anatase-to-rutile phase transition provided that experiments are performed in a vacuum or in an argon atmosphere. Ricci et al. further indicates that no phase transition occurs in air or in oxygen atmospheres. The method disclosed requires high vacuum conditions ($5 \times 10^{-5}$ Torr) or argon atmosphere and is a complicated synthesis process.

Accordingly, achieving high-quality crystalline TiO2 films at room-temperature remains an important technical challenge on the path towards low-cost optoelectronic devices including photovoltaic cells and photocatalytic device architectures. With the advent of laser-based particle sintering used for additive manufacturing, researchers have demonstrated optically-induced phase conversion from anatase-to-amorphous TiO2 using low intensity visible light under vacuum. More recently, the same photo-activation process was reported under oxygen-poor conditions. It was also reported that high-temperature and slow-processing Fe-doped and Al-doped TiO2 nanoparticles can respectively promote (Fe) or inhibit (Al) the anatase-to-rutile phase transition under UV-laser irradiation. Despite the elevated cost of the synthesis route, this approach takes the process one step further by achieving micropatterning of rutile phase. However, such doping may be contrary to the doping requirements of the electronic, optical, or opto-electronic devices being manufactured.

Therefore, it would be beneficial to have an amorphous $TiO_2$ precursor that would allow crystalline phase spatial patterning and for which the crystallization of the amorphous $TiO_2$ precursor could be triggered at low energies and with which the crystalline phase could be controlled at room-temperature without necessitating complex handling in order to produce $TiO_2$ crystalline phases that are sufficiently stable even over a prolonged period of time. Such a $TiO_2$ precursor would be a good base to produce products that conform to environmental requirements and would allow integration with a wide range of manufacturing methodologies.

It would further be beneficial to have a process that could control a conversion of the $TiO_2$ precursor from amorphous-to-anatase, amorphous-to-rutile, amorphous-to-mixture of anatase/rutile or from amorphous-to-anatase-to-rutile in a simple and efficient manner that could be easily scalable to industrial requirements and that could be compatible with various manufacturing technologies such as emerging three-dimensional (3D) 3D printing technologies.

Moreover, it would be beneficial to be able to produce a controllable $TiO_2$ precursor in the form of a powder, a slurry, a sol-gel or a solution such as an ink to facilitate the integration of this solution in various manufacturing techniques such as in additive manufacturing techniques.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to titanium dioxide ($TiO_2$), and more particularly to the provisioning of a chemically stable amorphous TiO2 precursor, processes for producing the TiO2 precursor, and processes for forming from the TiO2 precursor a thin film of titanium oxide having regions with one or more crystallized phases. Forming the thin film of TiO2 with one or more crystallized phases being achievable at room temperature under ambient atmospheric conditions by controllably defining at least one stable converted crystallization phase at a desired region of the film. The crystallization phases being one or more crystalline structures of titanium dioxide where different crystalline phases can be formed next to one another within a single manufacturing step.

In accordance with an embodiment of the invention there is provided a method of converting amorphous titanium dioxide nanoparticles comprising:
  establishing a precursor of amorphous titanium dioxide (TiO2) nanoparticles;
  depositing the precursor onto a substrate to form a film of amorphous TiO2 nanoparticles; and
  selectively exposing one or more regions of the film of amorphous TiO2 nanoparticles to controlled optical illumination at a predetermined optical wavelength and optical power density, wherein
  for each region the amorphous TiO2 particles are converted to either an anatase TiO2 phase, a mixed anatase-rutile TiO2 phase and a rutile TiO2 phase in dependence upon the optical power density employed within that region.

In accordance with an embodiment of the invention there is provided a method comprising: establishing a precursor of amorphous titanium dioxide (TiO2) nanoparticles;
  depositing the precursor onto a substrate to form a film of amorphous TiO2 nanoparticles; and
  selectively exposing one or more regions of the film of amorphous TiO2 nanoparticles to a controlled electron beam illumination at a predetermined energy and power density, wherein
  for each exposed region the electron beam illumination triggers nucleation and crystallization of the amorphous TiO2 particles.

In accordance with an embodiment of the invention there is provided a producing an amorphous titanium dioxide nanoparticle precursor material.

In accordance with an embodiment of the invention there is provided an amorphous titanium dioxide nanoparticle precursor material.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present specification is directed to titanium dioxide ($TiO_2$, TiO2) and more particularly to the provisioning of a chemically stable amorphous TiO2 precursor, processes for producing the TiO2 precursor, and processes for forming from the TiO2 precursor a thin film of titanium oxide having regions with one or more crystallized phases (each phase being a monocrystalline phase). Forming the thin film of TiO2 with one or more crystallized phases being achievable at room temperature under ambient atmospheric conditions by controllably defining at least one stable converted crystallization phase at a desired region of the film. The crystallization phases being one or more crystalline structures of titanium dioxide which can be formed next to one another within a single manufacturing step.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "sol-gel" as used herein may refer to, but is not limited to, a process for producing a solid material from one or more starting materials wherein a solution ("sol") evolves towards the formation of a gel-like diphasic system comprising both a liquid phase and a solid phase which is then, typically, processed to yield only the solid phase. The precursor "sol" may be deposited onto a substrate to form a film (e.g., by dip coating or spin coating), cast into a suitable container with the desired shape (e.g., to obtain monolithic ceramics, glasses, fibers, membranes, aerogels), or used to synthesize powders (e.g., microspheres, nanospheres). The sol-gel approach allows for fine control of the product's chemical composition as even small quantities of dopants, such as organic dyes and rare-earth elements, can be introduced in the sol and end up uniformly dispersed in the final product. "Sol-gel" processing may be employed for, but not limited to, ceramic materials, glassy materials, metal oxides and hybrid materials.

"Titanium dioxide" as used herein may refer to, but is not limited to, the oxide of titanium having the chemical formal $TiO_2$ and is also known as titanium (IV) oxide and titania. Titanium dioxide having a variety of forms including the naturally occurring minerals rutile, anatase and brookite, and additionally two high pressure forms, a monoclinic baddeleyite-like form and an orthorhombic α-PbO2-like form. Titanium dioxide has eight modifications in addition to rutile, anatase, and brookite, comprising three metastable phases which can be produced synthetically, namely monoclinic [$TiO_2(B)$], tetragonal [$TiO_2(H)$] and orthorhombic [$TiO_2(R)$], and five high-pressure forms, namely an α-PbO2-like [$TiO_2(II)$], a baddeleyite-like [akaogiite], a cotunnite-like ($TiO_2(OII)$), an orthorhombic phase [$TiO_2(OI)$], and a cubic phase.

"Rutile" as used herein may refer to, but is not limited to, titanium dioxide ($TiO_2$) in one of its mineral forms, the others being anatase and brookite. Rutile being categorized by a tetragonal unit cell in the crystal class ditetragonal dipyramidial with unit cell parameters a=b=4.584 Å, and c=2.953 Å.

"Anatase" as used herein may refer to, but is not limited to, titanium dioxide ($TiO_2$) in one of its mineral forms, the others being rutile and brookite. Anatase being categorized by a tetragonal unit cell in the crystal class ditetragonal dipyramidial with unit cell parameters a=b=3.785 Å, and c=9.5143 Å.

"Brookite" as used herein may refer to, but is not limited to, titanium dioxide ($TiO_2$) in one of its mineral forms, the others being anatase and rutile. Brookite being categorized by an orthorhombic unit cell in the crystal class dipyramidial with unit cell parameters a=5.4558 Å, b=9.1819 Å and c=5.1429 Å.

A: Sol-Gel Precursor Formation

According to one embodiment, there is a process of forming an amorphous TiO2 sol-gel precursor. The amorphous TiO2 sol-gel precursor is adapted to produce various TiO2 crystallization phases when controllably triggered low-energies. According to one embodiment, the crystallization of the amorphous TiO2 sol-gel precursor is controllably triggered at room-temperature and in ambient air with low-power laser-induced photo-activation.

The formation process of the TiO2 sol-gel precursor, according to an embodiment, exploits an incomplete non-hydrolytic sol-gel ester elimination reaction of titanium (IV) isopropoxide (TTIP) and oleic acid (OA). For instance, 3.36 g of TTIP and 10 g of OA are mixed at room temperature under a nitrogen atmosphere. The resulting mixture has a light-yellow coloration is heated to 280° C. over a period of 20 minutes (at a rate of 14° C. min$^{-1}$) and kept at this temperature for 2 hours during which time the light-yellow solution gradually turns to a dark brown coloration. At this point, the solution is cooled down to room temperature and ethanol is added in excess to yield a beige precipitate. The solution is then centrifuged for 30 minutes to recuperate the TiO2 nanoparticles. The recuperated TiO2 nanoparticles can then be re-dispersed in hexane for re-use or be kept as a powder for further processing. The recuperated TiO2 nanoparticles advantageously requires low energy to be activated (e.g. low activation energy) and can easily achieve crystalline phase transitioning with low laser energy irradiation, under atmospheric conditions, without any additive or dopant.

Figure 1A:
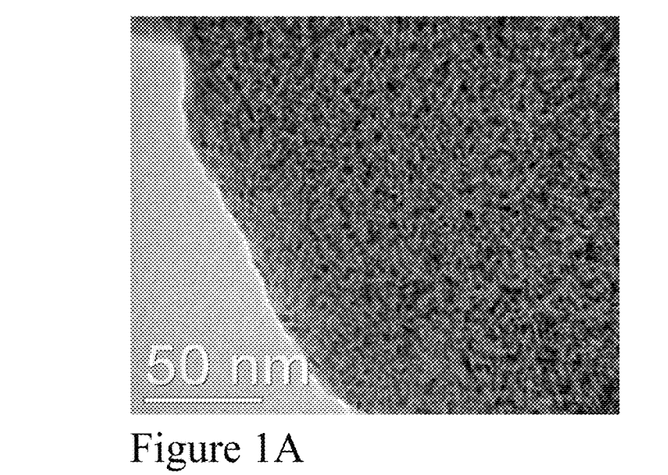
FIG. 1A depicts a TEM image of amorphous TiO2 nanoparticles as synthetized using a sol-gel process according to an embodiment.

A transmission electron micrograph (TEM) of recuperated TiO2 nanoparticles is depicted in FIG. 1A. FIG. 1A presents a TEM image of the pristine amorphous TiO2 nanoparticles as synthesized via the sol-gel formation process (i.e. sol-gel route) wherein a TiO2 nanoparticle suspension in hexane was held at room temperature within a glass substrate at the bottom of a container and the hexane allowed to slowly evaporate to yield a glass substrate with a 23 μm film of amorphous TiO2 nanoparticles upon it. According to an embodiment, the recuperated TiO2 nanoparticles have a size that is smaller or equal to 14 nm.

Within other embodiments of the invention the recuperated TiO2 nanoparticles may include one or more organic and/or inorganic components provided that these are not adversely affected from the physical and chemical processes occurring during the optically initiated conversion process (es). Optionally, different organic and/or inorganic compounds may be selectively incorporated during a single deposition process of the precursor or they may be added through multiple deposition processes of the precursor. Within other embodiments of the invention the organic and/or inorganic compounds may be incorporated with the precursor during its formation which are subsequently deposited.

Figure 1B:
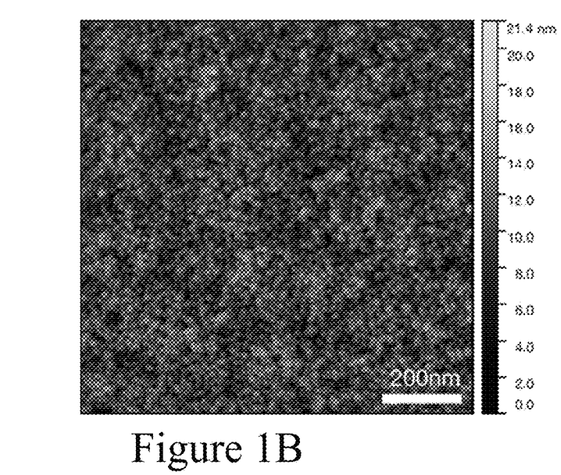
FIG. 1B depicts an AFM image of a thin film of amorphous TiO2 nanoparticles produced using a sol-gel process according to an embodiment with an average nanoparticle diameter around 10 nm.
Figure 1C:
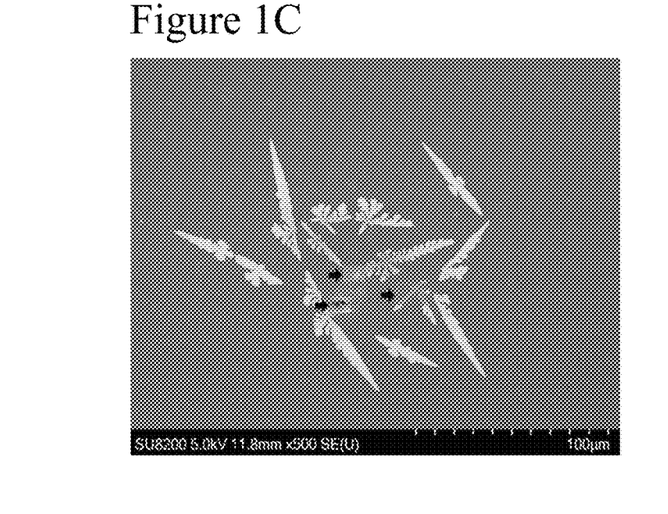
FIG. 1C depicts an SEM image of the amorphous TiO2 films after focusing under SEM.
Figure 1D:
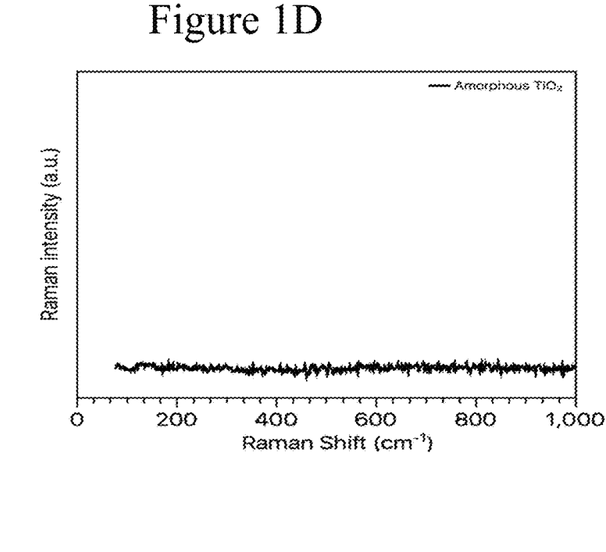
FIG. 1D depicts the Raman spectroscopy of the amorphous film of TiO2 prior to conversion wherein the absence of any defined crystalline structure yields no peaks in this analysis as expected for an amorphous phase of TiO2.

B: Fabrication of the Patternable Amorphous TiO2 Nanoparticle Films using Sol-Gel Chemistry According to one embodiment there is a method of patterning a substrate using sol-gel chemistry for producing patterned TiO2 films. Initially, a glass substrate is placed at the bottom of a beaker or container filled with a TiO2 nanoparticles dispersion such as a dispersion produced by sol-gel chemistry or produced by any other suitable method. The beaker is then covered with a perforated parafilm membrane to allow slow evaporation of the hexane solvent at room-temperature. When the solvent is completely evaporated, which could take under certain conditions approximately 24 hours, the glass substrate is removed yielding a 23 µm thickness film of amorphous TiO2 nanoparticles created over its surface. FIG. 1B depicts an atomic force microscopy (AFM) image of the thin film of amorphous TiO2 nanoparticles synthesized via the sol-gel chemistry. FIG. 1C depicts a scanning electron microscope (SEM) image of the amorphous TiO2 film after focusing under the SEM. The arrows point out the charging effect areas where the electron beam was focused whilst the light areas in the film correspond to crystallized areas where the focused electron beam triggered nucleation and transformation from amorphous to crystalline TiO2. The amorphous nature of the TiO2 nanoparticle film formed is noticeable in FIGS. 1B to ID. FIG. 1D depicts the result of Raman spectroscopy upon an as deposited film of TiO2 nanoparticles. In addition, an X-ray diffraction (XRD) analysis is performed to further confirm the amorphous nature of the as depicted TiO2 nanoparticle film.

By observing the SEM image of this amorphous nanoparticle film in FIG. 1C, it can be noticed that the focused electron beam from the SEM is sufficient to initiate a nucleation and crystallization of the amorphous TiO2 film. The lighter "fern leaf-shaped" areas indicate where the nucleation process occurred. From there, it spreads along the film following fractal patterns. Accordingly, this nucleation and crystallization depicted in FIG. 1C confirms that the recuperated TiO2 requires relatively low photo-activation energy. It shall be recognized that when the TiO2 film is not perfectly uniform, the thicker areas of the TiO2 film require an increased irradiation voltage ranging between 5 kV to 15 kV to trigger nucleation under the SEM. Unfortunately, it was not possible to obtain Raman signatures of these crystallized features since they were too small for the spatial resolution of the confocal Raman microscope available to the inventors.

C: Patterning On-Demand Crystalline Structure Over Amorphous TiO2 Films

It can be noticed from the SEM that the amorphous TiO2 nanoparticles have a very low activation energy to initiate the phase transformation. Whilst direct write electron beam (e-beam) lithography for patterning the amorphous TiO2 nanoparticles may be employed in common with other direct write e-beam processes such as e-beam lithography etc. due to the processing speed of such e-beam processes these tend to be limited to the highest resolution devices such as those requiring resolutions below 100 nm. Accordingly, low-power laser-induced photoactivation is used to generate mixed structures of anatase and/or rutile. Whilst the embodiments described below exploit direct write techniques using a laser it shall be recognized that the process may be adapted to exploit reticle or mask-based processes wherein illumination over a larger area is performed with masking and the time and/or intensity of the illumination adjusts the optical power density coupled to the amorphous TiO2 nanoparticle film to form either an anatase, rutile or mixed anatase-rutile crystallization phase within the film at a desired region.

Accordingly, the experimental configuration employed for the results presented below exploits direct writing and process adjustment by controlling the power density of the laser. According to one embodiment, a WI Tec Alpha300 confocal Raman microscope equipped with a 60 mW fiber-coupled continuous-wave laser at 532 nm and a mechanical attenuator are controlled to produce a source beam for phase patterning the amorphous TiO2 film, i.e. defining the pattern of crystalline phases of the resulting TiO2 material such that different regions may be converted to different phases by adjustment of the irradiating beam energy. The source beam is coupled through a 10X objective for excitation of the amorphous TiO2 and is mounted on a motorized high-precision XYZ stage.

Figure 2A:
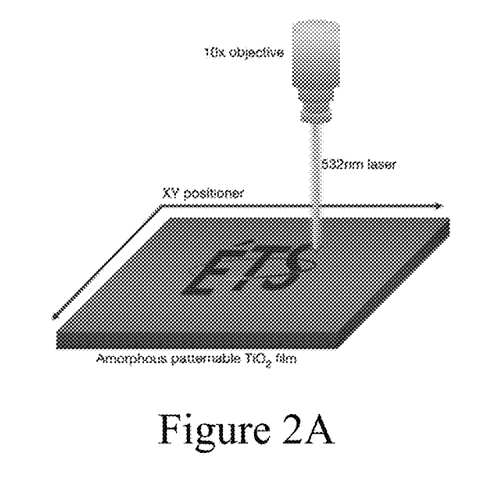
FIG. 2A depicts a schematic of the experimental setup used for laser-induced photo-activation of the TiO2 structure according to an embodiment.
Figure 2B:
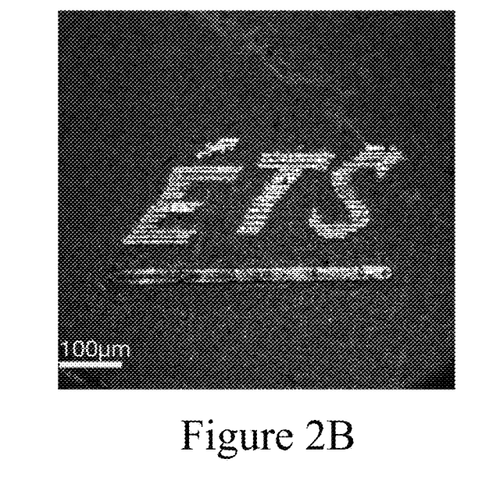
FIG. 2B depicts a laser scanning microscope image of the amorphous TiO2 films after crystalline phase alteration via a process according to an embodiment wherein the patterned letters ETS consist of anatase-phase crystalline TiO2, while the underline consists of rutile-phase crystalline TiO2, and the darker background consists of amorphous TiO2
Figure 2C:
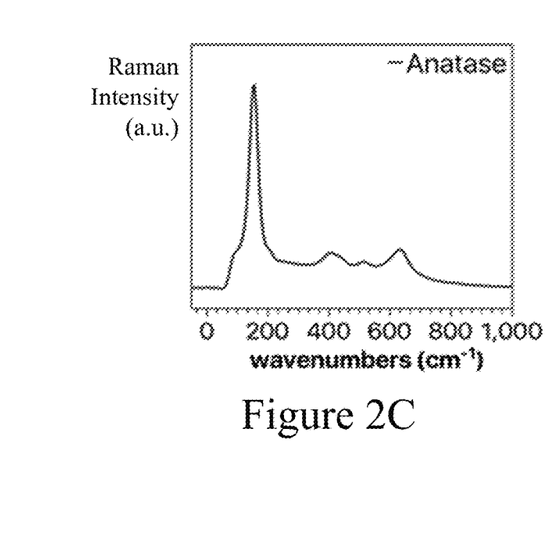
FIG. 2C depicts Raman micro-spectroscopy measurements of the anatase crystalline phase of the TiO2 formed using an embodiment.
Figure 2D:
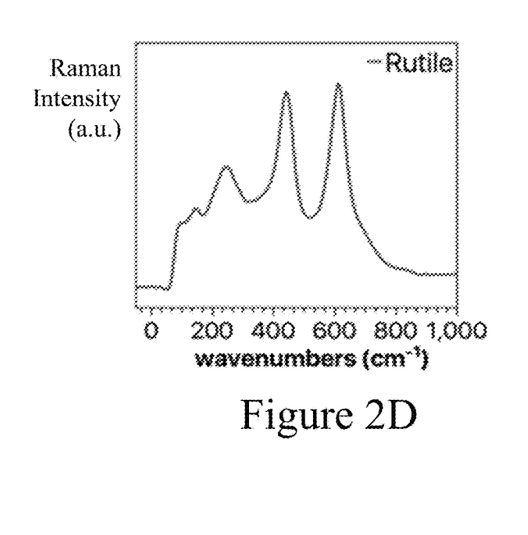
FIG. 2D depicts Raman micro-spectroscopy measurements of the rutile crystalline phase of the TiO2 formed using an embodiment.
Figure 3:
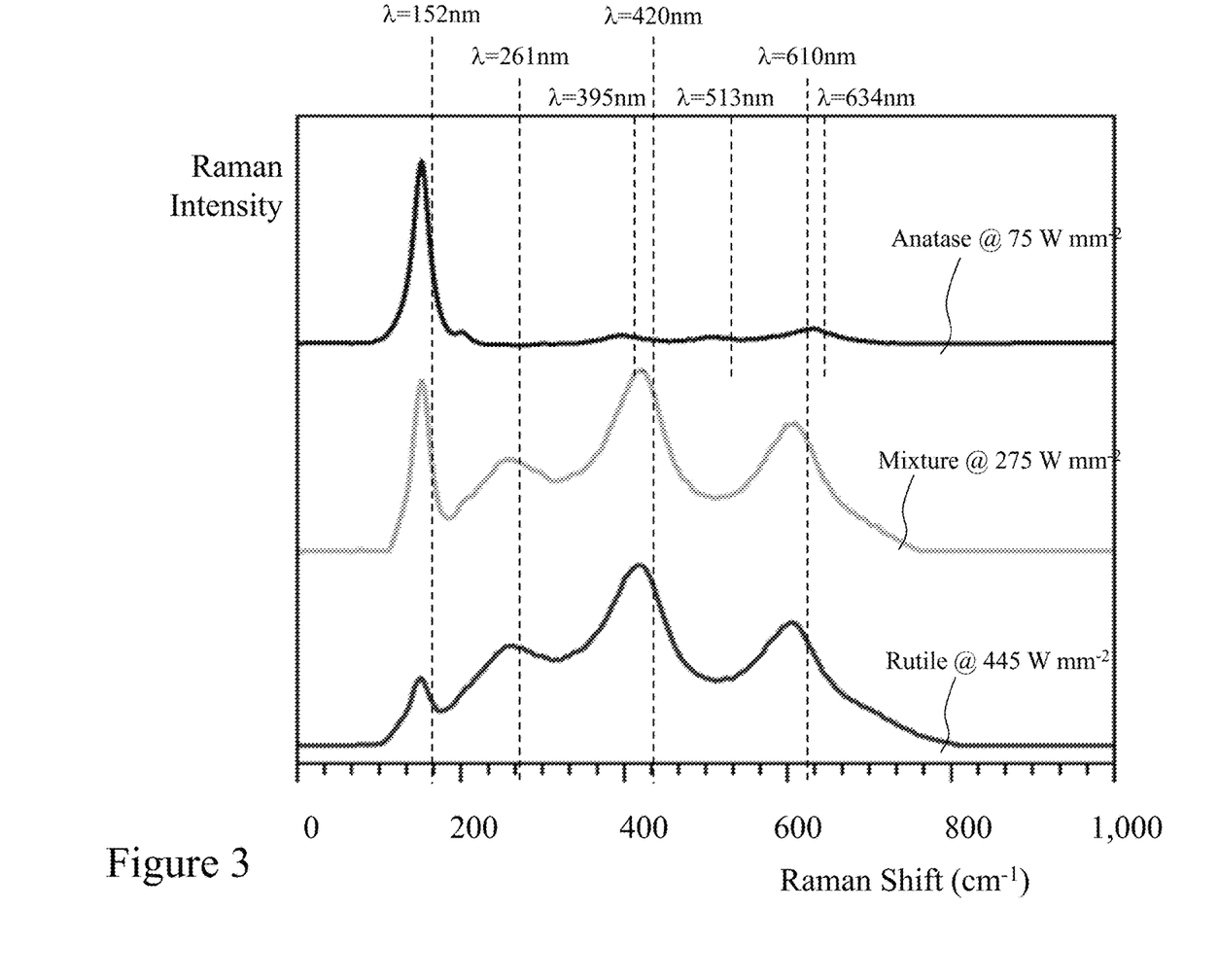
FIG. 3 depicts Raman spectra of the various TiO2 crystalline structures obtained using different excitation laser power densities with a process according to an embodiment.

Referring to FIG. 2A there is depicted a schematic of the spatially-resolved laser-induced photoactivation process for the amorphous TiO2 nanoparticle film. FIG. 2B depicts a laser scanning microscope image of the amorphous TiO2 nanoparticle film after crystalline phase alteration using the spatially-resolved laser-induced photoactivation process. As can be noticed the letters "ETS" have been patterned to consist of anatase-phase crystalline TiO2, while the underline mark consists of rutile-phase crystalline TiO2. The darker background consists of the unaltered amorphous TiO2 film. The different crystalline phases are confirmed by Raman micro-spectroscopy measurements as depicted in FIGS. 2C and 2D respectively. The process can controllably photo-activate the phase transition from the amorphous TiO2 to the anatase and/or rutile phase at room-temperature and in ambient environment by adjusting the excitation power density. In this embodiment, a power density of above 75W $mm^{-2}$ is required to complete the transition to anatase TiO2 (the "ÉTS" letters in FIG. 2B) The transition to rutile TiO2 is completed using an incident power density of above 445 W $mm^{-2}$ (the horizontal line under "ÉTS" in FIG. 2B). Referring to FIG. 3 the anatase and rutile crystalline phases are confirmed by Raman micro-spectroscopy results in the uppermost and lowermost curves respectively for high-resolution Raman spectra of each crystalline structure obtained at these different laser power densities. However, at an intermediate power density, e.g. 275 W $mm^{-2}$, as depicted in the middle curve of FIG. 3 the process yields a mixture of both anatase and rutile crystalline TiO2 phases.

Figure 4A:
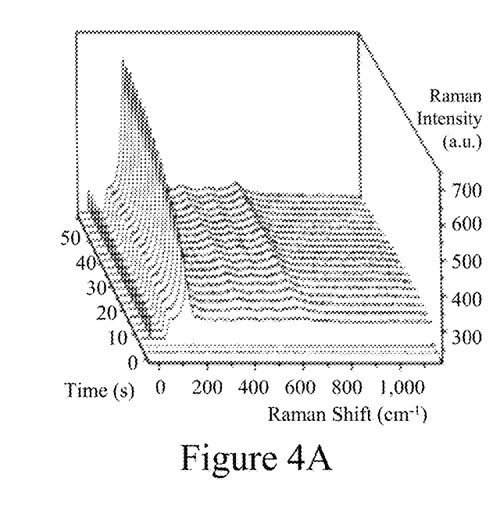
FIG. 4 depicts the evolution of crystalline structure as function of time for the transition from amorphous to pure anatase, mixed anatase/rutile and pure rutile at different power densities respectively taken over 1 minute together with Raman peak intensity evolution for the dominant Raman peak recorded over 1 hour for the conversion to anatase, mixed anatase/rutile and rutile respectively generated with a process according to an embodiment.
Figure 4B:
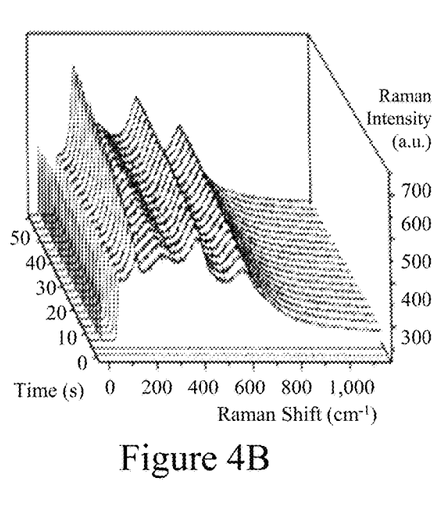
Figure 4C:
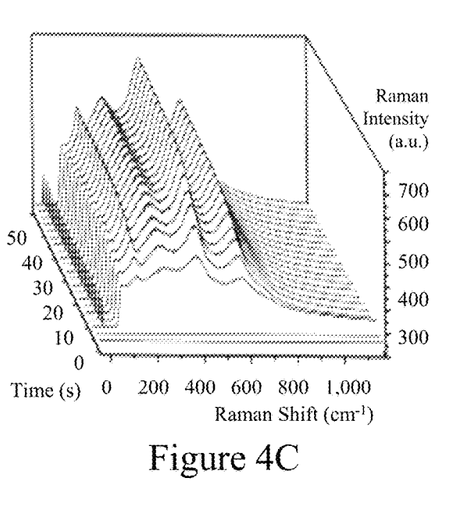
Figure 4D:
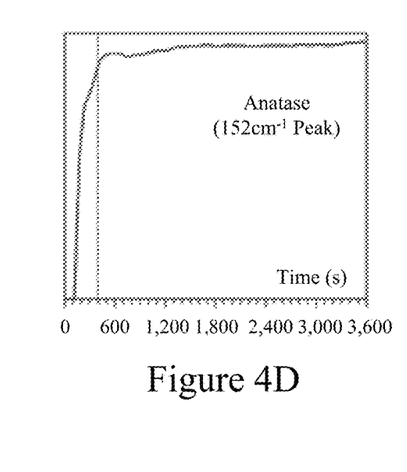
Figure 4E:
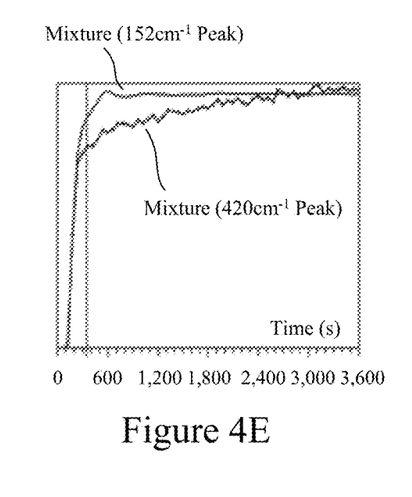
Figure 4F:
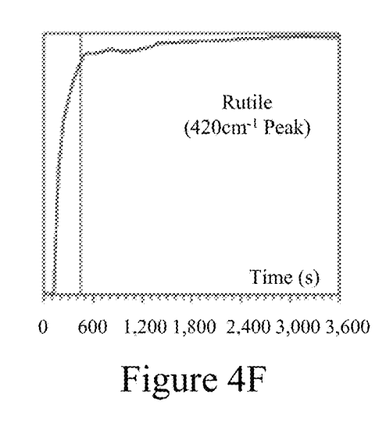

In order to analyse the influence of the incident laser power density on the crystallization process, the transient evolution of the Raman signature is recorded over a period of 1 minute after opening the laser shutter at the 5 second mark. Additionally, the Raman peak intensity evolution for the dominant Raman peak is recorded over 1 hour for the conversion process. These results are depicted in FIG. 4A to FIG. 4F where:

FIG. 4A depicts the transient evolution of the Raman signature for the laser-assisted crystallization kinetics to reach anatase at 75 W $mm^{-2}$;

FIG. 4B depicts the transient evolution of the Raman signature for the laser-assisted crystallization kinetics to reach mixed anatase and rutile at 275 W $mm^{-2}$;

FIG. 4C depicts the transient evolution of the Raman signature for the laser-assisted crystallization kinetics to reach rutile at 445 W $mm^{-2}$;

FIG. 4D depicts the Raman peak intensity evolution for the dominant Raman peak for the laser-assisted crystallization kinetics to reach anatase at 75 W $mm^{-2}$;

FIG. 4E depicts the Raman peak intensity evolution for the dominant Raman peak for the laser-assisted crystallization kinetics to reach mixed anatase and rutile at 275 W $mm^{-2}$; and FIG. 4F depicts the Raman peak intensity evolution for the dominant Raman peak for the laser-assisted crystallization kinetics to reach rutile at 445 W $mm^{-2}$.

The crystallization process for all three TiO2 polymorphs starts as soon as the amorphous film is exposed to the laser irradiation. In each of FIGS. 4A to 4C the laser shutter opens at the 5-second mark. In FIGS. 4D to 4F the dashed vertical line marks the time required to reach 90% of maximum Raman intensity. However, it is evident in each that the crystallization process for all three TiO2 polymorphs begins as soon as the amorphous film is exposed to the laser irradiation.

For the pure anatase crystalline phase obtained using a 75 W mm$^{-2}$ power density, the identifying peak at 152 cm$^{-1}$ starts to appear during the first 6 seconds of laser exposure. The other characteristic peaks of the anatase phase at 395 cm$^{-1}$, 513 cm$^{-1}$ and 634 cm$^{-1}$ are well defined after only 30 seconds of exposure. The other TiO2 crystalline phase transitions observed exhibit similar behavior shown in FIG. 4D.

In the mixed crystalline structure generated under 275 W mm$^{-2}$ exposure, well-defined rutile characteristic peaks such as 152 cm$^{-1}$, 261 cm$^{-1}$, 420 cm$^{-1}$ and 610 cm$^{-1}$ can be observed instantly after laser exposure. As depicted in FIG. 4B, the intensity of all these peaks increases over time but, contrary to the characteristic peak ratios present in rutile, the peak at 152 cm$^{-1}$ still dominates, suggesting incomplete transition from anatase to rutile. Indeed, the transient evolution of the 152 cm$^{-1}$ peak behaves similarly to what can be observed for anatase, indicating the presence of a mixed, anatase and rutile, crystalline phase achieved at this power density. FIG. 4E depicts the evolution of the 152 cm$^{-1}$ rutile peak, which rapidly increases upon laser exposure before reaching saturation. On the other hand, the mixed anatase/ rutile phase behaves more as a transitional state, where contributions of both phases are perceived simultaneously. As such, the mixture phase displays both strong 152 cm$^{-1}$ (from anatase) and 420 cm$^{-1}$ (from rutile) peaks. With higher portion of anatase phase dominating the Raman spectra, it is possible that the peak at 420 cm$^{-1}$ displays different kinetics due to the contribution of the adjacent anatase peaks and displays its distorted and irregular behavior.

For the rutile crystalline structure generated at higher power densities, it is possible to observe in FIG. 4C the well-defined rutile peaks at 152 cm$^{-1}$, 261 cm$^{-1}$, 420 cm$^{-1}$ and 610 cm$^{-1}$ immediately after laser exposure. FIG. 4F depicts the evolution of the dominant 420 cm$^{-1}$ rutile peak.

In all cases, only small changes in the intensity of the Raman signal after the first 600 seconds of exposure can be noticed, suggesting that conversion is complete after a short exposure time and that the process is not cumulative over time.

Figure 5A:
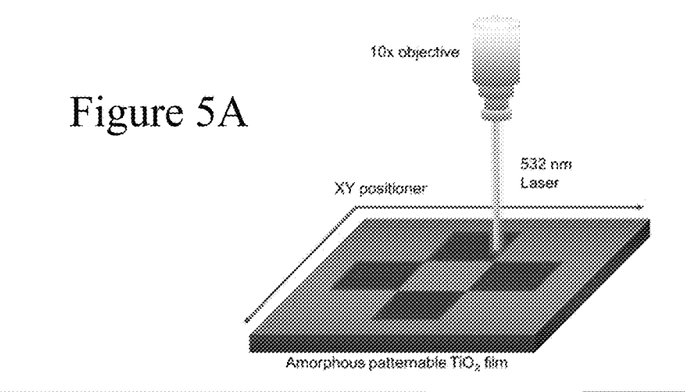
FIG. 5A depicts a schematic of laser printing a checkered pattern onto an amorphous TiO2 film to pattern anatase TiO2 and rutile TiO2 regions adjacent to one another.

In order to study in detail, the patterning process and its effect on the amorphous TiO2 film structure, anatase and rutile crystalline structures were patterned in a checkered pattern upon the same substrate from the same deposited amorphous TiO2 nanoparticle film as depicted schematically in FIG. 5A. The dominant crystalline phase is confirmed by performing a Raman mapping of the photo-activated areas. Each transition, from amorphous to anatase or rutile is selectively achieved by controlling the laser power density. It is important to note that the patterning velocity need not be uniform during the processing. In fact, all the patterns that are shown in the Figures are produced by manually moving the XY positioner using a joystick rather than computer based control of the motorized stages. It shall be recognized that despite this limitation the processing yields good results however automation of this process would yield improved results. Since laser exposure induces crystalline conversion in the amorphous TiO2 films, the excitation power density within the confocal Raman system is kept below 75 W mm–2 for the acquisition of the Raman data.

Figure 5B:
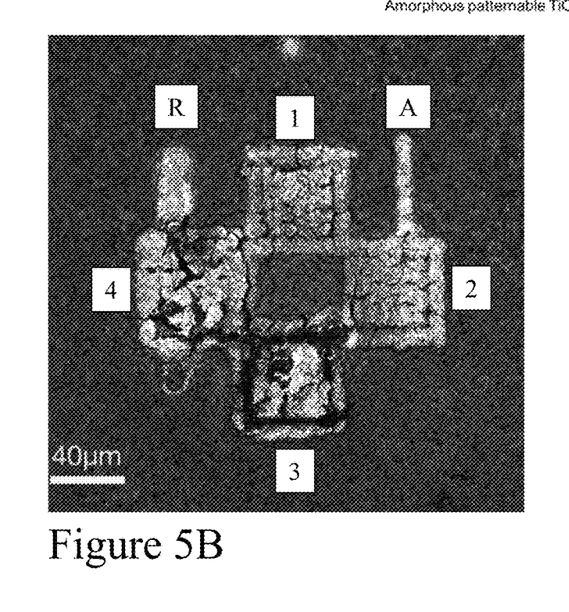
FIG. 5B depicts a laser scanning microscope image of a checkered pattern over amorphous TiO2 films wherein anatase TiO2 is generated in squares 1 and 2 and rutile TiO2 is generated in the squares 3 and 4 with a process according to an embodiment.
Figure 5C:
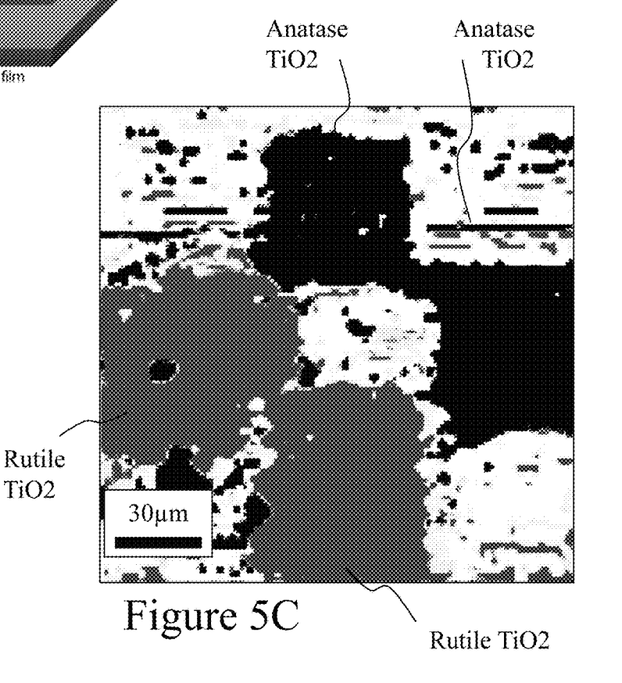
FIGS. 5C and 5D depict different false coloured maps for a micro-Raman image of the pattern depicted in FIGS. 5A and 5B.
Figure 5D:
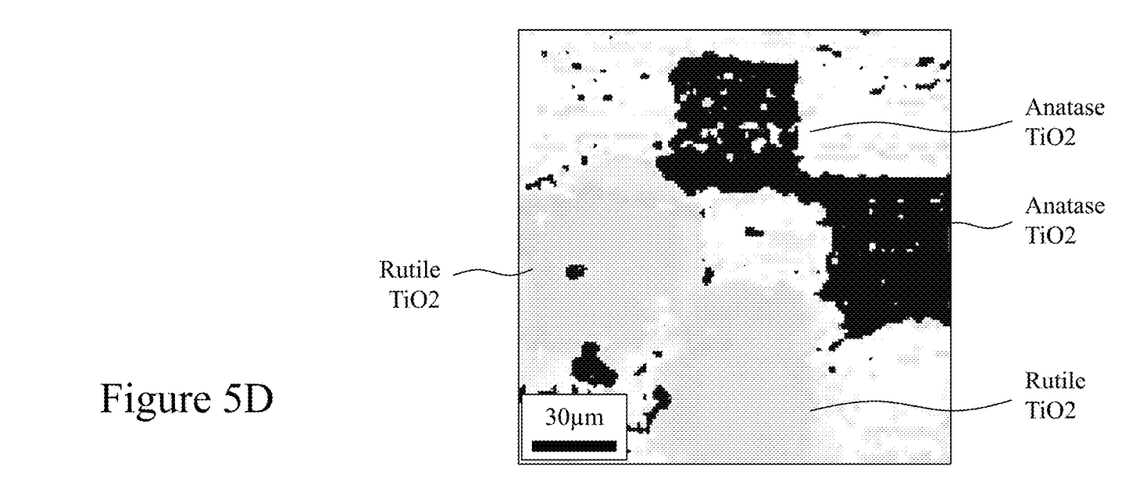
Figure 5E:
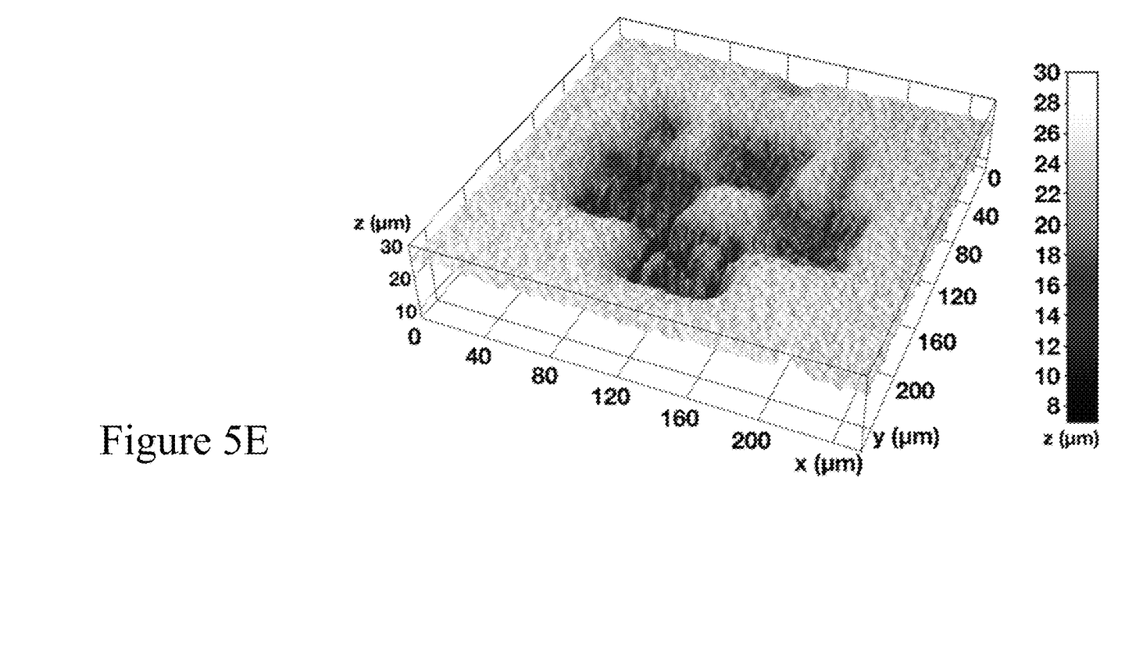
FIG. 5E depicts a topographic 3D surface reconstruction for the checkered pattern depicted in FIGS. 5A and 5B.

FIGS. 5B to 5D present the anatase areas having a well-defined shape. Referring to FIG. 5B the Trace A corresponds to the path left by the laser during the anatase patterning process. This path is narrow with an approximate width of 9.3 µm. The rutile areas are also well defined, but the crystalized area was bigger than intended. This arises as the result of the wider trace left by the laser during the rutile patterning process. The laser spot of the laser does not change while increasing the power density but the affected area in the film is increased. The width of the trace R in FIG. 5B is approximately 17.2 µm. Referring to FIG. 5B the anatase TiO2 is formed in squares 1 and 2 whilst rutile TiO2 is generated in squares 3 and 4. FIGS. 5C and 5D depict two false colour maps of a micro-Raman image of the pattern. In each figure the darker "squares" are rutile TiO2 whilst the lighter "squares" are the anatase TiO2 respectively. In FIG. 5E a topographic 3D surface reconstruction for the checkered pattern is depicted using image processing of data acquired during laser scanning microscope analysis.

As noted supra the visible difference between traces A and R in FIG. 5B arise from the different values of power density required to crystalize each phase; i.e. an increment in power density during the patterning process translated in an increment in the width of the trace left by the laser. Within FIG. 5B it also possible to view the clear contrast difference between the amorphous area and the crystallized regions in the patterned sample. In the crystallized regions, the color changes from dark to light gray and cracks can be clearly observed in all crystallized regions, especially in the rutile TiO2 regions. These cracks appear as a direct consequence of the natural densification of the TiO2 during the crystallization process. Indeed, the atoms reorganize during the laser-induced photo-activation process. This reorganization at the atomic level results in an important reduction in volume which led to the generation of the cracks in the photoconverted regions. The density values reported in the literature are 3830 kg m–3 and 4240 kg m–3 for anatase and rutile, respectively. Such reduction generates cracks in the photoconverted regions. Cracks observed in the rutile TiO2 regions are more pronounced than cracks formed in anatase regions.

Figure 8:
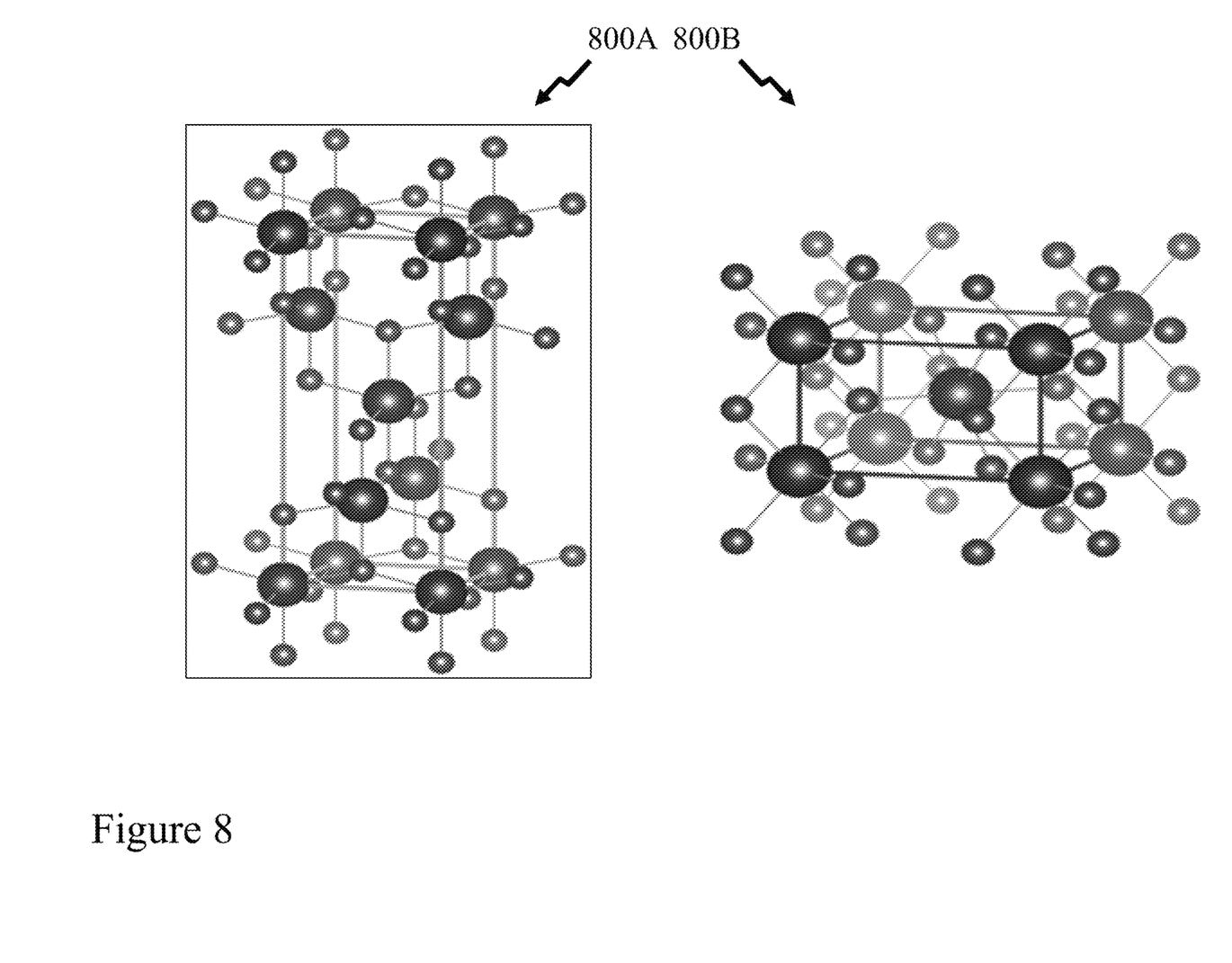
FIG. 8 depicts unit cells for the anatase TiO2 and rutile TiO2 respectively.

This contrast is explained by the smaller unit-cell volume for rutile TiO2. As shown below in Table 1, the volume of the anatase unit-cell is more than twice the volume of the rutile unit-cell. In other words, during rutile patterning, atoms get closer and the reorganization of its lattice generates more shrinkage, resulting in larger and deeper cracks when the material crystallizes. This loss of volume on the material becomes more noticeable when analyzing the structure using a 3D topographic surface reconstruction of the checkered pattern. In FIG. 5D, it is noticeable that the anatase tiles are shallower, smoother and more regular than the rutile tiles. The rutile regions also exhibit deeper cracks as the densification of the TiO2 occurs to a greater extent in rutile compared with anatase. FIG. 8 depicts in first and second images 800A and 800B respectively the unit cells of the anaphase and rutile phases of TiO2 respectively.

TABLE 1

Unit Cell Dimensions and Volume for Anatase TiO2 and Rutile TiO2

| Phase | Anatase | Rutile |
|---|---|---|
| a | 3.73 Å | 4.59 Å |
| b | 3.73 Å | 4.59 Å |
| c | 9.37 Å | 2.95 Å |
| Unit Cell Volume | 130.36 Å$^3$ | 62.42 Å$^3$ |

It shall be recognized that phase stability within nanocrystalline TiO2 is known for its great dependence on the particle size.

With the sol-gel precursor process described herein, the synthetized amorphous TiO2 nanoparticles have a size of around 10 nm. When processed with the laser illumination at different intensities anatase, rutile and mixed anatase-rutile phases can be formed within a single process on the deposited TiO2 film. Indeed, complex patterns are achieved on the deposited film through laser patterning. It is therefore shown that localized thermal effects caused by the focused laser are responsible for the crystalline phase transition.

Within the laser irradiation processes and results described and depicted with respect to FIGS. 1A to 5E respectively the irradiation source is a 532 nm laser. Although this laser energy is smaller than the 3.2 eV bandgap of TiO2, the absorption of this visible light is attributed to the presence of oxygen vacancies generated during the synthesis of the TiO2 nanoparticles. Accordingly, the oxygen vacancies create band states within the TiO2 bandgap that effectively allow the absorption of the 532 nm laser irradiation while raising the energy of the system. Further, this also promotes lattice relaxation, helping with the rearrangement process of the ions that participate in the phase transition.

The phase transition phenomenon relies on the ability of the material to absorb or desorb molecular oxygen. In other words, the high concentration of oxygen facilitates the phase transition due to the ionic mobility created in oxygen vacancies wherein these vacancies relax the lattice and facilitate the rearrangement of ions for the transition from anatase to rutile.

Figure 6:
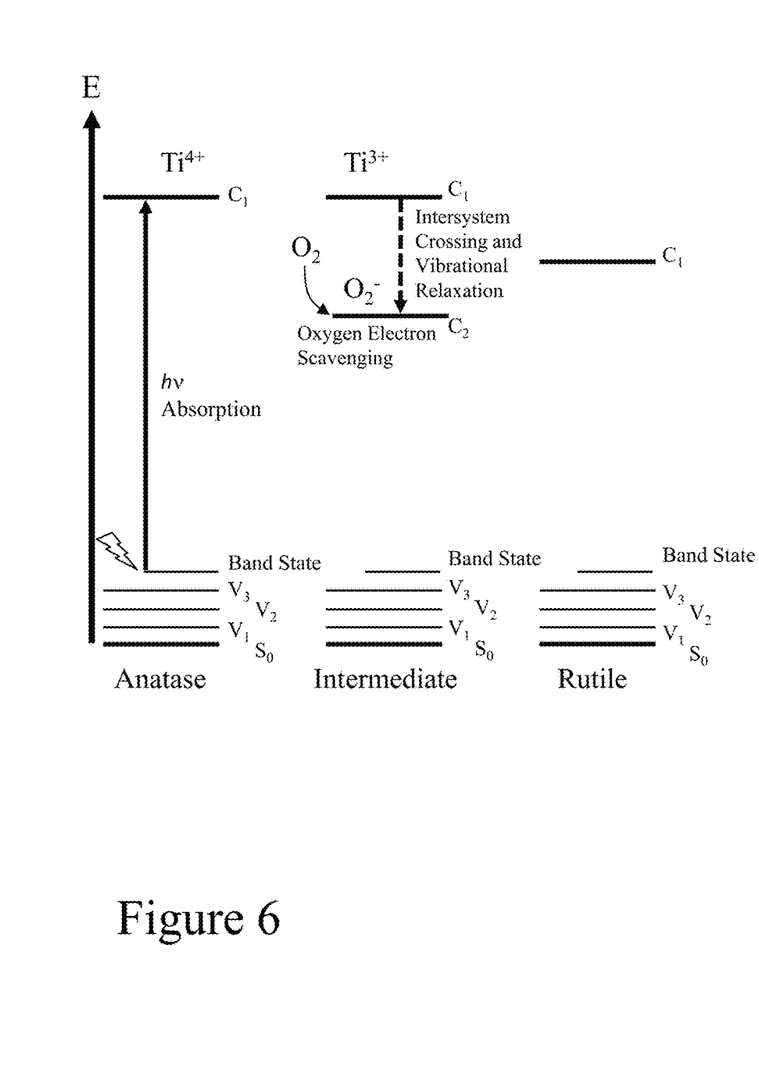
FIG. 6 depicts a proposed Jablonski diagram for the laser-induced phase transition from anatase to rutile TiO2 according to an embodiment.

In contrast with processes that require an oxygen rich atmosphere, the present process is performed at room temperature, in ambient air and at normal atmospheric conditions, the oxygen molecules present in ambient air act as very efficient photoexcited electron scavengers, trapping the excited electrons from the conduction band into the surface states of the TiO2. The oxygen molecules are then adsorbed at the surface of the TiO2 nanoparticles to partially compensate these oxygen vacancies wherein the presence of these oxygen vacancies then promotes the formation of $Ti^{3+}$ sites in the crystal structure as the electrons left behind by the vacancy are distributed on neighboring, Ti sites, reducing them from $Ti^{4+}$ to $Ti^{3+}$. At this point, assisted by the continuous laser irradiation, the adsorbed oxygen molecule passivates the TiO2 by bridging the metallic ions. As a result of the phase transition and the relaxation of the electrons, a vibrational phonon is emitted as heat. This sequence is depicted by FIG. 6 which presents a proposed Jablonski diagram for the laser-induced phase transition from anatase to rutile TiO2, according to an embodiment.

In fact, the process of forming the anatase phase produces additional oxygen vacancies that advantageously promote the formation of the rutile phase if the anatase phase region is further excited at the required laser intensity.

Accordingly, a low-power laser-assisted photoactivation process for TiO2 nanostructured amorphous films can be performed at room-temperature in an ambient environment. This approach allows to selectively and controllably convert to the anatase and/or rutile crystalline phases by controlling the laser power density incident on a film of amorphous TiO2 nanoparticles synthesized through an incomplete nonhydrolytic sol-gel ester elimination reaction. According to one embodiment, the incomplete nonhydrolytic sol-gel ester elimination reaction employs titanium isopropoxide and oleic acid.

Figure 7:
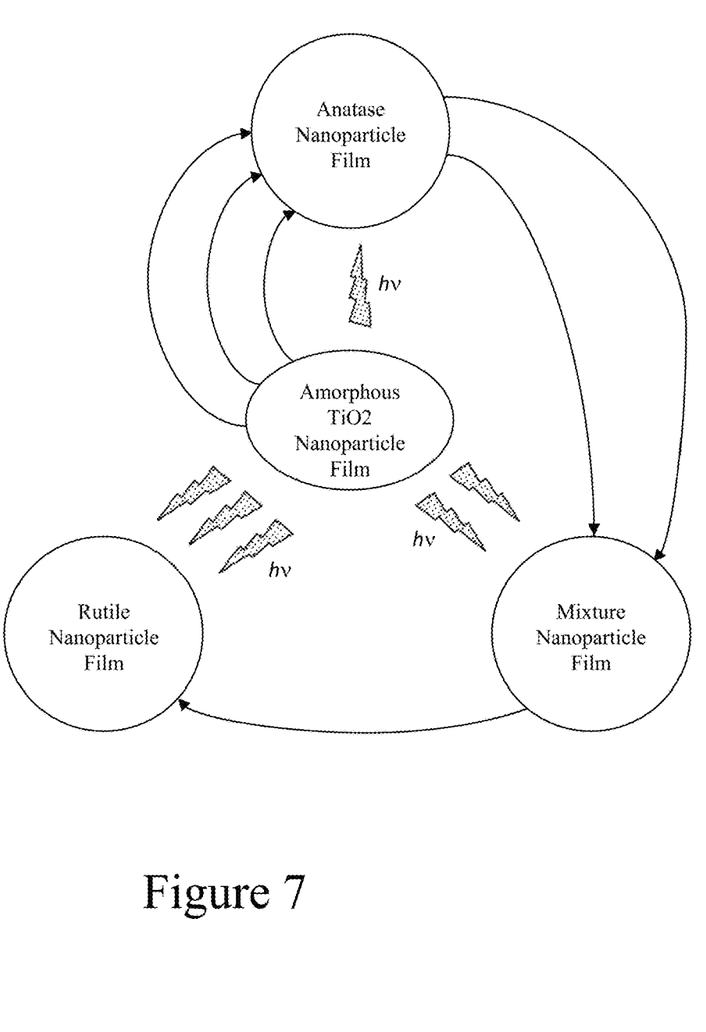
FIG. 7 depicts via a schematic the sequential conversion process from amorphous TiO2 to anatase phase, mixed anatase/rutile phase, and final rutile phase using a sol-gel nanoparticle film and photonic excitation method according to an embodiment.

FIG. 7 depicts schematically the sequential conversion process from amorphous TiO2 to anatase phase TiO2, mixed anatase/rutile phase TiO2, and final rutile phase TiO2 using a sol-gel nanoparticle film and photonic excitation method. The initial amorphous TiO2 is a film of TiO2 nanoparticles most of which have a dimension of approximately 14 nm or less.

Raman micro-spectroscopy allows for observation of the controllable transition to pure anatase, mixed anatase/rutile and pure rutile crystalline phases generated using different laser power densities. Transient evolutions are also measured using time-resolved Raman micro-spectroscopy that show that the crystallization occurs in the very first seconds of irradiation, that the effect is permanent and non-cumulative. Laser scanning microscope images and 3D topographic surface reconstruction of the photo-activated areas also verified the loss in volume after crystallization due to the denser atomistic reorganization after phase transition. The present method can be used to spatially-organize different crystalline phases with high level of precision to study new synergistic effects.

The present amorphous TiO2 nanoparticles have a size that is under 14 nm and allows laser-assisted phase transition to anatase. Moreover, the present process allows to provide additional oxygen vacancies in the anatase phase. The additional oxygen vacancies facilitate the transition from the anatase to rutile phase. Indeed, the subsequent transition from anatase to rutile, it relies upon the high capacity of the synthetized TiO2 to absorb molecular oxygen.

Importantly, all the phase transitions presented within the present sol-gel chemistry and laser based processing are achieved without any dopant in the TiO2 film prior to photoactivation of the crystallization process. Accordingly, this facilitates integration of TiO2 into many photo-electro-catalytic applications. Additionally, the ability to process with an accurate, reproducible and scalable method crystalline TiO2 with varying composition in one region or differing compositions at adjacent regions within a single fabrication process sequence offer the opportunity to establish novel pathways of TiO2-based platforms, especially for energy conversion and environmental applications.

According to one embodiment, there is a provide a fabrication methodology for a pure amorphous TiO2 ink which can be easily included within printing platforms, e.g. 3D printing platforms, as well as conventional semiconductor style device manufacturing techniques. The photonic excitation employed and presented supra was at 532 nm. Optical sources at this wavelength may exploit an infra-red pumped, frequency doubled diode-pumped solid-state laser. Alternatively, the laser may be an argon ion laser emitting at 528.7 nm, a krypton laser emitting at 531 nm, a frequency doubled Nd: YAG laser at 532 nm, a frequency doubled Nd: YLF laser, a frequency doubled, or diode pumped Nd: YVO4 laser at 532 nm, a diode pumped KTP laser at 532 nm, or a sapphire laser at 532 nm for example.

According to another embodiment, there is a fabrication of a pure amorphous TiO2 powder which can be provided as a base to produce an ink, a slurry or a tablet (e.g. compressed powder) depending on the area of application or available storage facilities and storage duration.

Whilst in the present embodiment a 532 nm optical source is used and discussed supra in respect of FIGS. 1 to 6, it shall be recognized that other optical wavelengths may be employed provided that the selected wavelength or wavelengths and energy are sufficient to trigger the amorphous TiO2 to anatase TiO2 transformation and carrier excitation within the anatase TiO2 phase from the valence band to the carrier band in order to support the subsequent oxygen scavenging process for forming the intermediate TiO2 phase and subsequently the rutile TiO2 phase. Replacement of the 532 nm wavelength laser employed in the conversion processes described above with an optical source emitting at 355 nm, e.g. a frequency tripled Nd: YAG, has also demonstrated conversion of the amorphous TiO2 film to one or more crystalline phases under ambient environmental condition.

Beneficially an incomplete nonhydrolytic sol-gel ester elimination reaction is used, and the process does not require any dopant thereby allowing the purity of the TiO2 nanoparticles and subsequent amorphous film to be defined.

Beneficially the process defined and described herein does not require any high temperature and/or high pressure processing of the TiO2 precursor.

Beneficially the process defined and described herein exploits amorphous TiO2 as the precursor rather than anatase TiO2.

Beneficially the process defined and described herein exploits undoped TiO2 as the precursor rather than doped TiO2.

Beneficially the process defined and described herein allows direct patterning within a single amorphous TiO2 nanoparticle film of regions of anatase, rutile and mixed rutile-anatase.

It is important to note that the process defined and described herein provides for spatially controlled, via focused optical beam excitation or patterned optical excitation, and high quality conversion of the amorphous TiO2 into either the anatase phase, the rutile phase or a mixed anatase-rutile phase from an amorphous TiO2 precursor.

Whilst the present process uses solvent evaporation to deposit the TiO2 nanoparticles from suspension it shall be recognized that the solvent suspended solution, or ink, may be employed with other well established fabrication techniques including, but not limited to, spin coating, spray coating, dip coating, evaporation etc.

The foregoing disclosure of the embodiments of the present solution have been presented for purposes of illustration and description. It is not intended to be exhaustive or to limit to the precise forms disclosed. Many variations and modifications of the embodiments described herein will be apparent to one of ordinary skill in the art in light of the above disclosure. The scope of the present is to be defined only by the claims appended hereto, and by their equivalents.

Further, in describing representative embodiments of the present solution s, the specification may have presented the method and/or process of the present solution as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present solution should not be limited to the performance of their steps in the order written, and one skilled in the art can readily appreciate that the sequences may be varied and still remain within the spirit and scope of the present solution.

What is claimed is:

1. A method of converting amorphous titanium dioxide nanoparticles into crystalline titanium dioxide nanoparticles, the method comprising:

synthesizing a precursor comprising amorphous undoped titanium dioxide ($TiO_2$) nanoparticles via an incomplete non-hydrolytic sol-gel ester elimination reaction using titanium (IV) isopropoxide and oleic acid such that oxygen vacancies creating band states within a $TiO_2$ band gap are generated within the amorphous undoped TiO2 nanoparticles;

depositing the precursor onto a substrate to form a film of amorphous undoped $TiO_2$ nanoparticles; and selectively exposing one or more regions of the film to an irradiation source having an energy lower than a band gap of $TiO_2$ such that the amorphous undoped $TiO_2$ nanoparticles within each of said one or more regions are independently converted to one of an anatase $TiO_2$ phase, a mixed anatase-rutile $TiO_2$ phase and a rutile $TiO_2$ phase, thereby yielding said crystalline titanium dioxide nanoparticles, wherein the band states within the $TiO_2$ band gap are such that exposure to the irradiation source triggers an initial conversion of the amorphous undoped $TiO_2$ nanoparticles within said one or more regions to said anatase $TiO_2$ phase; and increased exposure of said anatase $TiO_2$ phase to the irradiation source results initially in a conversion of said anatase $TiO_2$ phase to said mixed anatase-rutile $TiO_2$ phase, and subsequently to said rutile $TiO_2$ phase.

2. The method according to claim 1, wherein providing the precursor does not require at least one of high temperature processing and high pressure processing.

3. The method according to claim 1, wherein exposition to the irradiation source between a first minimum optical power density and a first maximum optical power density converts the amorphous undoped $TiO_2$ nanoparticles to said anatase $TiO_2$ phase;

exposition to the irradiation source above a second minimum optical power density converts the film of amorphous undoped $TiO_2$ nanoparticles to said rutile $TiO_2$ phase; and exposition to the irradiation source above the first maximum optical power density but below the second minimum optical power density converts the amorphous undoped $TiO_2$ nanoparticles particles to said mixed anatase-rutile $TiO_2$ phase.

4. The method according to claim 1, wherein the sol-gel ester elimination reaction comprises:

mixing the titanium (IV) isopropoxide and oleic acid under a predetermined gas at a predetermined first temperature;

raising the temperature to a predetermined second temperature for a predetermined duration; and terminating the reaction while it is incomplete by reducing the temperature to a predetermined third temperature;

adding a predetermined chemical; and recuperating the precursor through a predetermined process.

5. The method according to claim 1, wherein the film of amorphous undoped $TiO_2$ nanoparticles incorporates one or more organic components via a single deposition process of the precursor or through multiple deposition processes of the precursor; and the one or more organic components are not affected by the selective exposure of the one or more regions of the film to the irradiation source and conversion of the amorphous undoped $TiO_2$ nanoparticles within said the one or more regions of the film to said crystalline titanium dioxide nanoparticles.

6. The method according to claim 1, wherein
the film of amorphous undoped $TiO_2$ nanoparticles incorporates one or more inorganic components via a single deposition process of the precursor or through multiple deposition processes of the precursor, wherein each of said one or more inorganic components is other than $TiO_2$; and
the one or more inorganic components are not affected by the selective exposure of the one or more regions of the film to the irradiation source and conversion of the amorphous undoped $TiO_2$ nanoparticles within said one or more regions of the film to said crystalline titanium dioxide nanoparticles.

7. The method according to claim 1, wherein
one or more organic components are incorporated with the precursor during said ester elimination reaction and are subsequently deposited with the precursor; and
the one or more organic components are not affected by the selective exposure of the one or more regions of the film to the irradiation source and conversion of the amorphous undoped $TiO_2$ nanoparticles within said one or more regions of the film to said crystalline titanium dioxide nanoparticles.

8. The method according to claim 1, wherein
one or more inorganic components are incorporated with the precursor during said ester elimination reaction and are subsequently deposited with the precursor, wherein each inorganic component of the one or more inorganic components is other than $TiO_2$; and
the one or more inorganic components are not affected by the selective exposure of the one or more regions of the film to the irradiation source and conversion of the amorphous undoped the film of amorphous undoped $TiO_2$ nanoparticles within said one or more regions of the film to said crystalline titanium dioxide nanoparticles.

9. The method according to claim 1, wherein, during the selective exposure, an environment of the substrate upon which the film of amorphous undoped $TiO_2$ nanoparticles is deposited is ambient atmosphere; and the temperature of the environment is room temperature.

10. The method according to claim 1, wherein
the irradiation source is an electron beam;
an irradiation voltage of the electron beam is established in dependence upon the thickness of the film of amorphous undoped $TiO_2$ nanoparticles; and
in each exposed region, electron beam illumination triggers nucleation and crystallization of the amorphous undoped $TiO_2$ nanoparticles.

11. The method according to claim 1, wherein the irradiation source induces carrier excitation within said anatase $TiO_2$ phase from the valence band to the carrier band to support an oxygen scavenging process which results in the subsequent formation of said mixed anatase-rutile $TiO_2$ phase and said rutile $TiO_2$ phase.

* * * * *